United States Patent
Nishimoto

(10) Patent No.: US 8,833,534 B2
(45) Date of Patent: Sep. 16, 2014

(54) TRANSMISSION FOR MULTI-WHEEL DRIVE VEHICLE

(75) Inventor: Shuji Nishimoto, Amagasaki (JP)

(73) Assignee: Kanzaki Kokyukoki Mfg. Co., Ltd., Hyogo ( * ) Notice: Subject to any disclaimer, the term of this patent is extended or adjusted under 35 U.S.C. 154(b) by 264 days.

(21) Appl. No.: 13/404,434

(22) Filed: Feb. 24, 2012

(65) Prior Publication Data

US 2012/0217116 A1    Aug. 30, 2012

(30) Foreign Application Priority Data

Feb. 24, 2011   (JP) .................................. 2011-039058

(51) Int. Cl.
*B60K 17/34*    (2006.01)
*F16D 43/21*    (2006.01)
*F16D 7/02*     (2006.01)
*B60K 17/344*   (2006.01)
*B60K 23/08*    (2006.01)
*B60K 17/08*    (2006.01)

(52) U.S. Cl.
CPC .............. *F16D 7/027* (2013.01); *B60K 17/344* (2013.01); *F16D 43/216* (2013.01); *B60K 23/08* (2013.01); *B60K 17/08* (2013.01)
USPC ......... 192/48.8; 192/56.6; 74/665 T; 180/233

(58) Field of Classification Search
USPC ........................................ 192/56.6; 74/665 T
See application file for complete search history.

(56) References Cited

U.S. PATENT DOCUMENTS

| 6,568,519 B2 * | 5/2003 | Lovatt ......................... 192/56.6 |
| 6,679,778 B2 * | 1/2004 | Ima ................................ 464/10 |
| 7,562,753 B2 * | 7/2009 | Ima et al. ........................ 192/35 |
| 2008/0004149 A1 | 1/2008 | Mohan et al. |
| 2010/0263958 A1 * | 10/2010 | Kochidomari et al. ....... 180/366 |

FOREIGN PATENT DOCUMENTS

| JP | 2000-108695 A | 4/2000 |
| JP | 2004-052789 A | 2/2004 |
| JP | 2010-247671 A | 11/2010 |
| WO | WO 2009/096975 | 8/2009 |

* cited by examiner

*Primary Examiner* — Richard M. Lorence
(74) *Attorney, Agent, or Firm* — Sterne, Kessler, Goldstein & Fox P.L.L.C.

(57) ABSTRACT

A transmission comprises a housing, a transmission gear mechanism disposed in the housing, an output shaft for transmitting power outputted from the transmission gear mechanism to a front wheel and a rear wheel in a vehicle, a torque limiter for the front wheel, and another torque limiter for the rear wheel. The output shaft is provided with both of the torque limiters in the housing. The transmission is protected from respective peak loads applied on the front wheel and the rear wheel.

4 Claims, 4 Drawing Sheets

TRANSMISSION FOR MULTI-WHEEL DRIVE VEHICLE

BACKGROUND OF THE INVENTION

1. Field of the Invention

The present invention relates to a transmission adaptable to a multi-wheel drive vehicle, such as a four-wheel drive vehicle, e.g., a utility vehicle or an all-terrain vehicle.

2. Related Art

A multi-purpose four-wheel drive vehicle designed to enable off-road traveling, e.g., a utility vehicle or an all-terrain vehicle, repeatedly inclines upward to apply sudden load (peak load) on its rear wheels and inclines downward to apply peak load on its front wheels while traveling on rough ground. In this regard, JP 2000-108695 A (hereinafter, referred to as "Reference 1") discloses a four-wheel drive vehicle, which is provided with a torque limiter for front wheels, and with another torque limiter for rear wheels, so as to protect its wheel-support system, gears in its traveling power transmission system and its engine from the peak loads applied on the front wheels and the rear wheels. Each of these torque limiters includes input side friction discs and output side friction discs, which are alternately aligned and are pressed against one another by a spring force. When the vehicle travels normally, the output side discs rotate integrally with the input side friction discs so as to transmit power from the engine to the corresponding wheels. When an abnormal torque (peak load) is applied on the front or rear wheels and is transmitted from the wheels to the output side friction discs, the output side friction discs receiving this torque delay to rotate behind the input side friction discs rotated by the engine power. In other words, relative rotation of the output side friction discs to the input side friction discs is allowed so as to prevent the torque applied on the output side friction discs from being transmitted to the input side friction discs. Therefore, the transmission of engine power to the wheels is reduced so as to reduce a burden on a wheel-support system supporting the wheels, and on gears in a transaxle including the wheel-support system. This burden is caused because both the load on the wheels and the engine power resisting the load are applied onto the transaxle and the wheel-support system.

In the vehicle disclosed in Reference 1, a front transaxle incorporates a differential unit carrying axles of the front wheels, and power for driving the front transaxle is taken off from a rear transaxle supporting axles of the rear wheels. This power for driving the front wheels is transmitted to the torque limiter in an input portion of the front transaxle via universal joints and a propeller shaft. Reference 1 discloses only the torque limiter for the front wheels, however, it is obvious for any skilled person that another torque limiter can also be disposed in the rear transaxle carrying the rear wheels.

Further, JP 2010-247671 A (hereinafter, referred to as "Reference 2") discloses an arrangement of a gear transmission for driving front wheels and rear wheels adaptable to a utility vehicle or an all terrain vehicle. This gear transmission is disposed between a front transaxle for driving front wheels and a rear transaxle for driving rear wheels. Each of the front and rear transaxles includes a housing incorporating a final power transmission mechanism, e.g., a gear train or a differential gear unit, for driving the front or rear wheels. The gear transmission includes another housing that incorporates a transmission gear mechanism. The gear transmission is arranged to continue to a belt transmission driven by an engine so that the transmission gear mechanism is driven by power outputted from the belt transmission. The gear transmission has an output shaft of the transmission gear mechanism. This output shaft is drivingly connected at a rear end thereof to an input portion of the rear transaxle via a rear power transmission device, and is drivingly connected at a front end thereof to an input portion of the front transaxle via a front power transmission device. For example, universal joints and a propeller shaft serve as each of the front and rear power transmission devices.

Further, JP 2004-52789 A (hereinafter, referred to as "Reference 3") discloses a transmission that is adaptable to a snow blower. This transmission includes a housing incorporating right and left axles and a transmission gear mechanism for driving the right and left axles. This housing also incorporates right and left clutch-type torque limiters for drivingly connecting the respective right and left axles to an output shaft of the transmission gear mechanism.

BRIEF SUMMARY OF THE INVENTION

If the transmission as disclosed by Reference 2 were adapted for driving the front and rear wheels of the vehicle equipped with the torque limiters as disclosed by Reference 1, the torque limiter for the rear wheels would be disposed in the input portion of the rear transaxle so as to be drivingly connected to the rear end of the output shaft of the transmission gear mechanism via the rear power transmission device (e.g., universal joints and a propeller shaft), and the torque limiter for the front wheels would be disposed in the input portion of the front transaxle so as to be drivingly connected to the front end of the output shaft of the transmission gear mechanism via the front power transmission device (e.g., the universal joints and a propeller shaft). As a result, the two torque limiters would be undesirably distributed between the front transaxle and the rear transaxle, so that both of the front and rear transaxles would lack compactness, and the entire vehicle power transmission system would lack assemblability. Here, the transmission disposed between the front and rear transaxles is desired to have a torque limiting function that can respond to respective peak loads applied on the front and rear wheels, however, the transmission is also desired to have sufficient compactness.

A first object of the invention is to provide a transmission disposed between a front transaxle and a rear transaxle, wherein both a torque limiter for front wheels and a torque limiter for driving rear wheels are disposed in the transmission so that the transmission has a torque limiting function that can respond to respective peak loads on the respective front and rear wheels, while the transmission has sufficient compactness.

To achieve the first object, the transmission according to the invention includes a housing, a transmission gear mechanism disposed in the housing, and an output shaft for transmitting power outputted from the transmission gear mechanism to a front wheel and a rear wheel in a vehicle. The transmission further includes a torque limiter for the front wheel and a torque limiter for the rear wheel. The output shaft is provided with both of the torque limiters in the housing.

Therefore, both of the torque limiters are disposed in the transmission. Accordingly, each of a front transaxle for driving the front wheel and a rear transaxle for driving the rear wheel can have another housing that is sufficiently compact because it does not need to incorporate a torque limiter. Further, since the output shaft is provided with the torque limiters, these torque limiters can be coaxial to each other so as to ensure their sufficient compactness in the radial direction of the output shaft, thereby ensuring sufficient compactness of the entire transmission.

Further, no torque limiter has to be installed in each of input portions of the respective transaxles, so that a vehicle power transmission system from the transmission to the front and rear wheels can be completed only by drivingly connecting the input portions of the respective transaxles to an output terminal of the transmission for driving the front wheels and to another output terminal of the transmission for driving the rear wheels. During travel of the vehicle, the torque limiters in the transmission function to effectively protect the transmission gear mechanism in the transmission and a power transmission system and a power source on the upstream of the transmission gear mechanism.

Preferably, in the transaxle, each of the torque limiters includes an input member, an input side friction disc engaging with the input member, an output member, and an output side friction disc engaging with the output member. When a load applied on the output member is not more than a load threshold, the output side friction disc is pressed against the input side friction disc so that the output side friction disc is rotatably integral with the input side friction disc so as to transmit power from the input member to the output member. When the load applied on the output member exceeds the load threshold, the output side friction disc rotates relative to the input side friction disc so as to prevent a torque of the output member caused by the load from being transmitted to the input member.

Therefore, each of the torque limiters is gradually shiftable between a normal state, where the friction discs pressed against each other are rotatably integral with each other so as to normally transmit power from the input member to the output member, and an abnormal state, where the friction discs abutting against each other are rotatable relative to each other, thereby reducing a shock in the shift of the torque limiter, in comparison with the rapid shift of the torque limiter disclosed in Reference 3 where dog clutch teeth are engaged and disengaged with and from each other.

Generally, even during normal travel of a vehicle equipped with the above-mentioned transmission, the rear wheel is liable to be more loaded than the front wheel. Therefore, a rear wheel-support system supporting the rear wheel and a front wheel-support system supporting the front wheel are configured so that the rear wheel-support system has an anti-load durability exceeding that of the front wheel-support system. In this situation, on the assumption that both the torque limiter for the front wheel and the torque limiter for the rear wheel are configured as mentioned above, i.e., each of the torque limiters has the input and output members and the friction discs, there arises a problem if the load thresholds of the respective torque limiters are equal to each other. The problem is that, if the load threshold is appropriate for protecting the front wheel-support system and gears in a front transaxle, the torque limiter for the rear wheel may be excessively frequently shifted to the abnormal state to cause insufficient power transmission from the transmission gear mechanism to the rear wheel while the peak load applied on the rear wheel is normal for the rear wheel-support system and gears in a rear transaxle, or that, if the load threshold is appropriate for the torque limiter for the rear wheel, the torque limiter for the front wheel may be undesirably kept in the normal state so as to accelerate degradation of the front wheel-support system and the gears in the front transaxle while the peak load applied on the front wheel becomes excessive for the front wheel-support system and the gears in the front transaxle.

To solve this problem, in the present transmission, the load threshold of the torque limiter for the front wheel is set to be smaller than the load threshold of the torque limiter for the rear wheel.

Therefore, the torque limiter for the rear wheel optimally responds to the peak load applied on the rear wheel while the torque limiter for the front wheel optimally responds to the peak load applied on the front wheel, thereby avoiding both the insufficient transmission of engine power to the rear wheel caused by the excessively sensitive response of the torque limiter for the rear wheel and the degradation of the front wheel-support system and the gears in the front transaxle caused by the dull response of the torque limiter for the front wheel.

Preferably, in the present transmission, the load threshold of at least one of the torque limiters is adjustable.

Therefore, the torque limiter can have an optimal load threshold that is adjusted to correspond to various designs and conditions of a vehicle equipped with the transmission, e.g., a weight balance of the vehicle between its front and rear portions, thereby realizing an optimal torque-limiting function for the vehicle.

Preferably, in the present transmission, the output shaft serves as the input member of one of the torque limiters, and the output shaft also serves as the output member of the other of the torque limiters.

Therefore, the one torque limiter needs no additional output member, and the other torque limiter needs no additional input member, thereby reducing the number of component parts and costs.

These, further and other objects, features and advantages of the invention will appear more fully from the following description with reference to drawings.

DETAILED DESCRIPTION OF THE INVENTION

Figure 1:
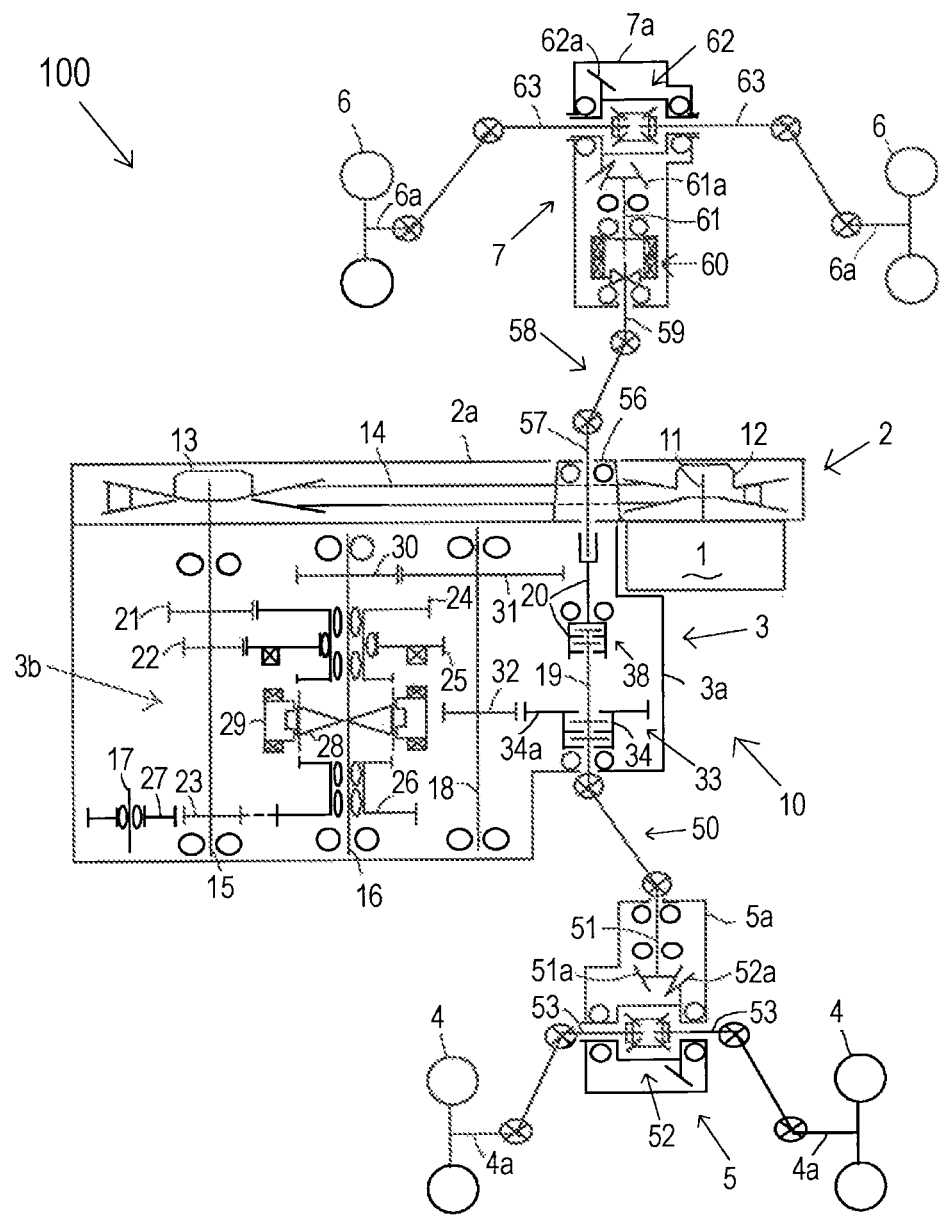
FIG. 1 is a skeleton diagram of a vehicle traveling transmission system including a transmission unit, a front transaxle and a rear transaxle.

A vehicle 100 has a traveling transmission system as shown in FIG. 1. Vehicle 100 includes a transmission unit 10 that is an assembly including an engine 1, a belt transmission 2, and a gear transmission 3. Belt transmission 2 serves as a main transmission driven by engine 1, and gear transmission 3 serves as an auxiliary transmission driven by belt transmission 2.

In vehicle 100, right and left rear wheels 4 and a rear transaxle 5 for driving right and left rear wheels 4 are disposed rearward from transmission unit 10. Further, in vehicle 100, right and left front wheels 6 and a front transaxle 7 for driving right and left front wheels 6 are disposed forward from transmission unit 10. An output of transmission unit 10, i.e., an output of gear transmission 3, is distributed between rear transaxle 5 and front transaxle 7.

Transaxles 5 and 7 will be described with reference to FIG. 1. Rear transaxle 5 includes a rear transaxle housing 5a, an input shaft 51, and right and left output shafts 53. Input shaft 51 is extended in the fore-and-aft direction of vehicle 100, and is supported by rear transaxle housing 5a. Right and left output shafts 53 are extended in the lateral direction of vehicle 100, and are supported by rear transaxle housing 5a.

A front end portion of input shaft 51 projects forward from rear transaxle housing 5a, and is drivingly connected to a rear end portion of a first output shaft (rear-wheel drive shaft) 19 that projects rearward from a later-discussed gear transmission housing 3a. Right and left output shafts 53 project rightwardly and leftwardly outward from rear transaxle housing 5a, and are drivingly connected to axles 4a of right and left rear wheels 4 via universal joints and propeller shafts, respectively.

Right and left output shafts 53 are differentially connected to each other via a differential gear unit 52 disposed in rear transaxle housing 5a. A bevel pinion 51a is fixed on a rear end of input shaft 51, and meshes with a bevel gear 52a serving as an input gear of differential gear unit 52.

Front transaxle 7 includes a front transaxle housing 7a, a clutch output shaft 61, and right and left output shafts 63. Clutch output shaft 61 is extended in the fore-and-aft direction of vehicle 100, and is supported by front transaxle housing 7a. Right and left output shafts 63 are extended in the lateral direction of vehicle 100, and are supported by front transaxle housing 7a.

Right and left output shafts 63 project rightwardly and leftwardly outward from front transaxle housing 7a, and are drivingly connected to axles 6a of right and left front wheels 6 via universal joints and propeller shafts, respectively. Right and left output shafts 63 are differentially connected to each other via a differential gear unit 62 disposed in front transaxle housing 7a. A bevel pinion 61a is fixed on a front end of clutch output shaft 61, and meshes with a bevel gear 62a serving as an input gear of differential gear unit 62.

A clutch input shaft 59 is inserted at a front end portion thereof into front transaxle housing 7a. In front transaxle housing 7a, a clutch 60, e.g., a dog clutch, is interposed between the front end portion of clutch input shaft 59 and a rear end portion of clutch output shaft 61. A rear end portion of clutch input shaft 59 projects rearward from front transaxle housing 7a. A front-wheel drive shaft 57 projects forward from a later-discussed belt transmission housing 2a of transmission unit 10, and is drivingly connected to the rear end portion of clutch input shaft 59 via universal joints and a propeller shaft 58.

When clutch 60 is engaged, the output of gear transmission 3 is transmitted to right and left output shafts 63, i.e., right and left front wheels 6, so that vehicle 100 travels by driving both right and left rear wheels 4 and right and left front wheels 6, i.e., in a four-wheel drive mode. When clutch 60 is disengaged, the output of gear transmission 3 is not transmitted to right and left output shafts 63, i.e., right and left front wheels 6, so that vehicle 100 travels by driving only right and left rear wheels 4, i.e., in a two-wheel drive mode.

Belt transmission 2 of transmission unit 10 will be described with reference to FIGS. 1 and 2. Belt transmission 2 includes belt transmission housing 2a having a rear end to which a front end of engine 1 and a front end of gear transmission housing 3a of gear transmission 3 are fixed.

In belt transmission housing 2a, a drive pulley 12 and a driven pulley 13 are disposed, and a belt 14 is interposed between pulleys 12 and 13. Engine 1 has a horizontal engine output shaft 11 that is extended forward into belt transmission housing 2a so as to serve as a rotary axis, i.e., a pulley shaft, for drive pulley 12. A horizontal speed-shift drive shaft 15 serves as an input shaft of a later-discussed transmission gear mechanism 3b, and is extended forward into belt transmission housing 2a so as to serve as a rotary axis, i.e., a pulley shaft, for driven pulley 13.

Belt transmission 2, serving as a continuously variable transmission (CVT), changes widths of pulley grooves of respective pulleys 12 and 13 in correspondence to change of rotary speed of engine 1, thereby steplessly changing its ratio of output rotary speed to input rotary speed.

Gear transmission 3 of transmission unit 10 will be described with reference to FIGS. 1 to 3. In gear transmission housing 3a, speed-shift drive shaft 15, a speed-shift driven shaft 16, an idle shaft 17, a reduction shaft 18, a first output shaft 19, and a second output shaft 20 are extended horizontally in the fore-and-aft direction of vehicle 100. Shafts 15, 16, 17, 18 and 19 are extended in parallel, and second output shaft 20 is coaxially extended forward from first output shaft 19. In gear transmission housing 3a, these shafts 15, 16, 17, 18, 19 and 20 and later-discussed gears provided on these shafts constitute transmission gear mechanism 3b.

Figure 2:
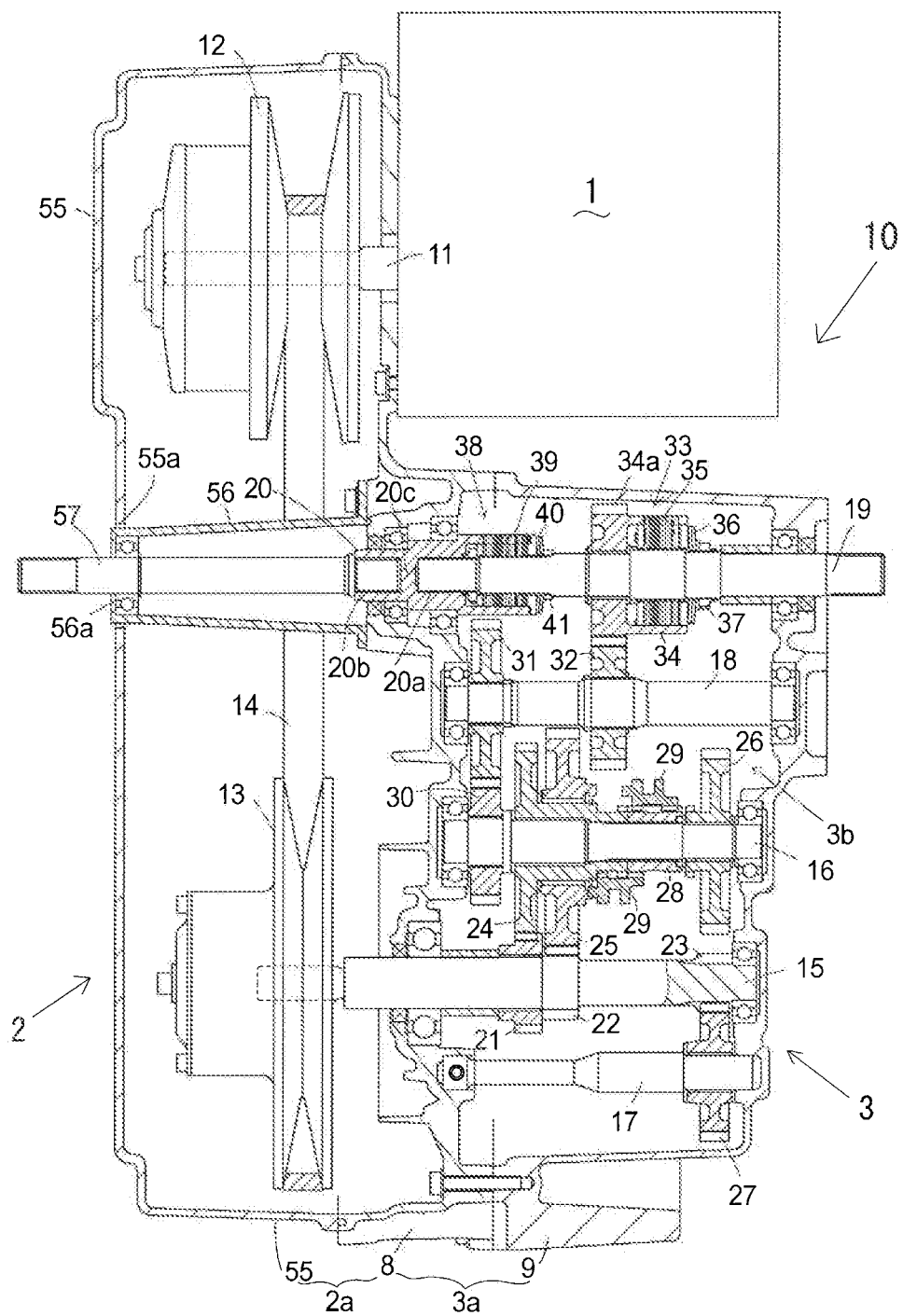
FIG. 2 is a developed sectional view of the transmission unit.

In this embodiment, as shown in FIG. 2, gear transmission housing 3a is formed by joining a front housing 8 and a rear housing 9 to each other. Front housing 8 also serves as a rear half portion of belt transmission housing 2a. In this regard, a front half portion 55 of belt transmission housing 2a is joined at a rear end thereof to a front end of front housing 8.

Rear housing 9 supports front ends of respective shafts 16, 17 and 18 via respective bearings. Speed-shift drive shaft 15 is supported by front housing 8 via a bearing, and projects at a front end portion thereof forward from front housing 8. First output shaft 19 is supported by rear housing 9 via a bearing, and projects at a rear end portion thereof rearward from rear housing 9. Second output shaft 20 is supported by front housing 8 via a bearing. A front end portion of first output shaft 19 is fitted into second output shaft 20 so as to be rotatable relative to second output shaft 20. A front end portion of second output shaft 20 projects forward from a wall portion of front housing 8 supporting second output shaft 20.

As mentioned above, the rear end portion of first output shaft 19, serving as the rear-wheel drive shaft, projects rearward from rear housing 9, and is drivingly connected to the front end portion of input shaft 51 of rear transaxle 5 via universal joints and a propeller shaft 50. The front end portion of second output shaft 20, serving as a front-wheel drive shaft, is formed therein with a spline shaft hole 20b that is opened forward. A rear end portion of front-wheel drive shaft 57 is formed as a spline shaft, and is fitted into spline shaft hole 20b so as to be rotatably integral with second output shaft 20.

A portion of front-wheel drive shaft 57 projecting forward from a front end portion of front housing 8 is supported in a shaft housing 56 via a bearing 56a. Shaft housing 56 is fixed at a rear end thereof to the front end portion of front housing 8. Shaft housing 56 is extended forward in belt transmission housing 2a of belt transmission 2 so as to be passed through a space between upper and lower portions of belt 14 extended between pulleys 12 and 13.

A front end of shaft housing 56 is disposed in a hole 55a provided in a front end wall of front half portion 55 of belt transmission housing 2a. Front-wheel drive shaft 57 projects at the front end portion thereof forward from the front end of shaft housing 56 at the front end of belt transmission housing 2a, and is drivingly connected to the rear end portion of clutch input shaft 59 of front transaxle 7 via the universal joints and propeller shaft 58, as mentioned above.

The only things required for opening belt transmission 2, while gear transmission housing 3a keeps supporting front-wheel drive shaft 57 via shaft housing 56, are to remove front half portion 55 of belt transmission housing 2a from front housing 8 and to move front half portion 55, because shaft housing 56 is fixed to the front end portion of front housing 8 that is formed integrally with the front portion of gear transmission housing 3a and the rear half portion of belt transmission housing 2a.

The front end portion of speed-shift drive shaft 15 serves as the rotary axis, i.e., the pulley shaft, of drive pulley 13 in belt transmission housing 2a of belt transmission 2. In gear transmission housing 3a, i.e., in rear housing 9, speed-shift drive shaft 15 is fixedly provided (or integrally formed) thereon with a high-speed normal drive gear 21, a low-speed normal drive gear 22, and a reverse drive gear 23.

A high-speed normal driven gear 24 is fitted on speed-shift driven shaft 16 so as to be rotatable relative to speed-shift driven shaft 16, and meshes with high-speed normal drive gear 21. A low-speed normal driven gear 25 is fitted on a central boss portion of high-speed normal driven gear 24 so as to be rotatable relative to high-speed normal driven gear 24, and meshes with low-speed normal drive gear 22.

A reverse driven gear 26 is fitted on speed-shift driven shaft 16 so as to be rotatable relative to speed-shift driven shaft 16, and meshes with an idle gear 27 supported on idle shaft 17. Idle gear 27 meshes with reverse drive gear 23. In this regard, in FIG. 2, idle gear 27 appears to be separated from reverse driven gear 26, however, actually, gears 26 and 27 mesh with each other as shown in FIG. 1.

In this way, a low-speed forward traveling gear train including gears 21 and 24, a high-speed forward traveling gear train including gears 22 and 25, and a backward traveling gear train including gears 23, 26 and 27 are interposed between speed-shift drive shaft 15 and speed-shift driven shaft 16.

A spline hub 28 is fixed on speed-shift driven shaft 16. A clutch slider 29 is fitted on spline hub 28 so as to be axially slidable and so as to be unrotatable relative to spline hub 28. By manipulating a speed-shift manipulator, e.g., a lever, a pedal or a dial, provided in vehicle 100, clutch slider 29 slides so as to be shiftable among four positions, i.e., a low-speed forward traveling position for meshing with low-speed normal driven gear 25, a high-speed forward traveling position for meshing with high-speed normal driven gear 24, a backward traveling position for meshing reverse driven gear 26, and a neutral position for meshing with none of gears 24, 25 and 26.

In this regard, in FIG. 2, for convenience of description, a portion of clutch slider 29 above speed-shift driven shaft 16 is illustrated as being set at the neutral position, and a portion of clutch slider 29 below speed-shift driven shaft 16 is illustrated as being set at the low-speed forward traveling position. The backward traveling position of clutch slider 29 is located rearward (rightward in FIG. 2) from the neutral position. The high-speed forward traveling position of clutch slider 29 is located between the low-speed forward traveling position and the neutral position.

Therefore, gear transmission 3 is set in one of a low-speed forward traveling state normally rotating speed-shift driven shaft 16 at a low speed stage, a high-speed forward traveling state normally rotating speed-shift driven shaft 16 at a high speed stage, a backward traveling state reversely rotating speed-shift driven shaft 16, and a neutral state isolating speed-shift driven shaft 16 from a rotary power of speed-shift drive shaft 15.

A gear 30 is fixed on speed-shift driven shaft 16, a gear 31 is fixed on reduction shaft 18, and gears 30 and 31 mesh with each other. A gear 32 is fixed on reduction shaft 18, a gear 34a is formed on an input member 34 of a later-discussed rear wheel torque limiter 33, and gears 32 and 34a mesh with each other. Therefore, gears 30, 31, 32 and 34a serve as a reduction gear train for transmitting a rotary power of speed-shift driven shaft 16 to input member 34 of rear wheel torque limiter 33.

First output shaft 19 serves as an output member of rear wheel torque limiter 33. Input member 34 is provided on first output shaft 19. Input side friction discs engaging with input member 34 and output side friction discs engaging with first output shaft 19 are alternately aligned so as to constitute friction discs 35 interposed between input member 34 and first output shaft 19. Rear wheel torque limiter 33 includes a nut 37 and a coned disc spring 36. Nut 37 is screwed on first output shaft 19, and coned disc spring 36 is interposed between nut 37 and friction discs 35 so as to apply its spring force to friction discs 35 for pressing friction discs 35 against one another.

An ON state of rear wheel torque limiter 33 is defined as a normal power transmission state where the output side friction discs are frictionally pressed against the input side friction discs so as to be rotatably integral with the input side friction discs. When a load applied on rear wheels 4 is within a normal range, a torque on first output shaft 19 caused by the load on rear wheels 4 is weak so that the output side friction discs frictionally pressed against the input side friction discs rotate following the input side friction discs rotated by the power of engine 1, whereby the output side friction discs rotate integrally with the input side friction discs. In this way, rear-wheel torque limiter 33 is set in the ON state, i.e., rear-wheel torque limiter 33 is engaged, so that input member 34 and first output shaft 19 rotate together, thereby normally transmitting power outputted from transmission gear mechanism 3b of gear transmission 3 to right and left rear wheels 4.

When rear wheel 4 is excessively loaded, the excessive load causes a torque (load torque) from rear wheels 4 to first output shaft 19 against the engine power. This torque load delays the rotation of first output shaft 19 relative to the rotation of input member 34 driven by the engine power, thereby increasing the torque of the output side friction discs that resists the rotation of the input side friction discs caused by the engine power. Wren the increased torque exceeds the spring force of coned disc spring 36 functioning to press friction discs 35 against one another, the rotation of the output side friction discs delays relative to the rotation of the input side friction discs so as to cause a relative rotation of the output side friction discs to the input side friction discs, thereby setting rear wheel torque limiter 33 in an OFF state so as to prevent input member 34 from receiving the torque of first output shaft 19 caused by the peak load applied on rear wheels 4. Therefore, the traveling power transmission system on the upstream side of input member 34 of rear wheel torque limiter 33 is protected from excessive peak load applied on rear wheels 4.

In this way, when the load applied on first output member 19 serving as the output member of rear wheel torque limiter 33 is not less than a load threshold defined by the spring force of coned disc spring 36, the input side friction discs engaging with input member 34 are pressed against the output side friction discs engaging with first output shaft 19 so that rear wheel torque limiter 33 transmits power from input member 34 to first output shaft 19. When the load applied on first output member 19 exceeds the threshold, the output side friction discs rotate relative to the input side friction discs so that rear wheel torque limiter 33 prevents input member 34 from receiving the torque of first output shaft 19 caused by the torque.

Incidentally, even if rear wheel torque limiter 33 is set in the OFF state, the output side friction discs are not completely separated from the input side friction discs. In other words, regardless of whether rear wheel torque limiter 33 is set in the ON state or the OFF state, a friction force is constantly generated between the input side friction discs and the output side friction discs. Therefore, rear wheel torque limiter 33 is gradually and smoothly shifted between the ON state and the OFF state without undesirable shock because there is no intermittence of power transmission between the input side friction discs and the output side friction discs.

When nut 37 having fastened coned disc spring 36 to friction discs 35 is rotated, the spring force of coned disc spring 36 applied to friction discs 35 is adjusted so as to adjust the above-mentioned load threshold, i.e., a required value of load applied from rear wheels 4 to first output shaft 19 for starting the above-mentioned relative rotation of friction discs 35. Therefore, any optimal load threshold can be selected so as to correspond to respective various designs of vehicle 100.

Figure 3:
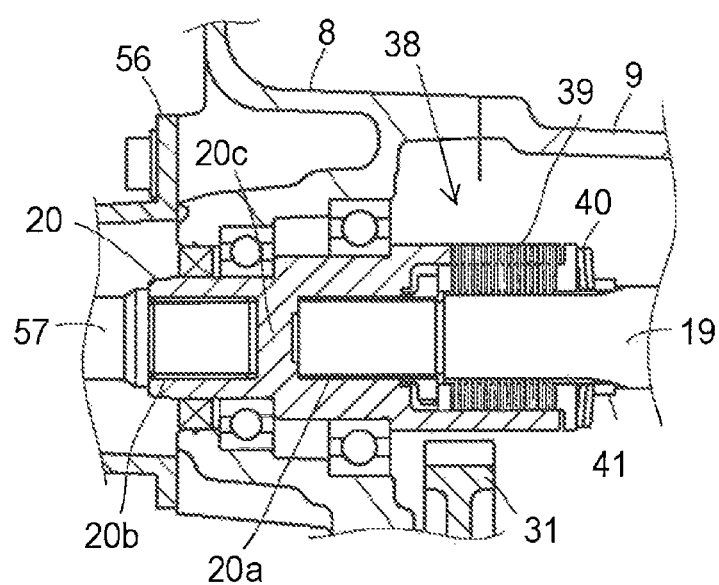
FIG. 3 is an enlarged sectional view of a front wheel torque limiter in a gear transmission shown in FIG. 2.

As shown in FIGS. 2 and 3, the front end portion of first output shaft 19 is fitted into a rearwardly opened shaft hole 20a formed in second output shaft 20 so as to enable first output shaft 19 to rotate relative to second output shaft 20. First output shaft 19 and second output shaft 20 constitute a front wheel torque limiter 38 in which first output shaft 19 serves as an input member of front wheel torque limiter 38, and second output shaft 20 serves as an output member of front wheel torque limiter 38. Further, in front wheel torque limiter 38, input side friction discs engaging with first output shaft 19 and output side friction discs engaging with second output shaft 20 are alternately aligned so as to constitute friction discs 39 interposed between first output shaft 19 and second output shaft 20. A coned disc spring 40 is fitted on first output shaft 19 so as to apply a spring force onto friction discs 39 in the direction to press friction discs 39 against one another. A nut 41 is screwed on first output shaft 19 so as to fasten coned disc spring 40 to friction discs 39.

When front wheels 6 are normally loaded, front wheel torque limiter 38 is set in an ON state, where the output side friction discs engaging with second output shaft 20 rotate integrally with the input side friction discs engaging with first output shaft 19 so as to normally transmit power from the input side to the output side. When the load applied on front wheels 6 exceeds a load threshold defined by the spring force of coned disc spring 40, front wheel torque limiter 38 is set in an OFF state, where the output side friction discs rotate relative to the input side friction discs so as to prevent a torque from being transmitted from second output shaft 20 to first output shaft 19. Nut 41 can be rotated to adjust the spring force of coned disc spring 40, thereby adjusting the threshold.

Vehicle 100 is configured with respect to its weight balance so as to apply load to rear wheels 4 rather than front wheels 6 during traveling of vehicle 100. In consideration of this tendency of vehicle 100, rear wheel torque limiter 33 has a capacity that is larger than a capacity of front wheel torque limiter 38.

More specifically, these capacities correspond to the above-mentioned load thresholds, i.e., limits of friction forces defined by the spring forces of coned disc springs 36 and 40 for keeping rotatability of the respective output side friction discs integrated with the respective input side friction discs. Therefore, the load threshold of rear wheel torque limiter 33 is set larger than the load threshold of front wheel torque limiter 38, thereby preventing rear wheel torque limiter 33 from being excessively frequently set in the OFF state caused by repetition of excessive load applied on rear wheels 4, and thereby preventing front wheel torque limiter 38 from being undesirably kept in the ON state while excessive load is applied on front wheels 6.

As mentioned above, in transmission gear mechanism 3b configured in gear transmission housing 3a of gear transmission 3, the high-speed forward traveling gear train, the low-speed forward traveling gear train, and the backward traveling gear twin are interposed between speed-shift drive shaft 15 and speed-shift driven shaft 16, and the reduction gear train is interposed between speed-shift driven shaft 16 and input member 34. Clutch slider 29 is operated to select one of the high-speed forward traveling gear train, the low-speed forward traveling gear train and the backward traveling gear train, and the output of belt transmission 2 is transmitted to the reduction gear train via the gear train selected by clutch slider 29. Power outputted from the reduction gear train is transmitted to first output shaft 19 serving as the rear wheel drive shaft via rear wheel torque limiter 33, and the rotary power of first output shaft 19 is transmitted to second output shaft 20 serving as the front wheel drive shaft via front wheel torque limiter 38.

As shown in FIGS. 2 and 3, and as mentioned above, second output shaft 20 is formed with rearwardly opened shaft hole 20a for relatively rotatably fitting the front end portion of first output shaft 19, and is formed with forwardly opened spline shaft hole 20b for spline-fitting the rear end portion of front wheel drive shaft 57. Second output shaft 20 is formed with a wall 20c between a front end of shaft hole 20a and a rear end of spline shaft hole 20b so as to separate holes 20a and 20b from each other.

Therefore, even if fluid used for lubricating friction discs 39 of front wheel torque limiter 38 flows on the outer peripheral surface of first output shaft 19 and reaches the front end portion of first output shaft 19 in shaft hole 20a, wall 20c prevents the fluid from leaking into front housing 8, i.e., belt transmission housing 2a, via front wheel drive shaft 57. Further, wall 2c absorbs thrust forces from first output shaft 19 and front wheel drive shaft 57. Further, this fluid-proof structure of wall 20c does not use a bore plug 44, a retaining ring 43 and a washer 42, which are used in a later-discussed fluid-proof structure shown in FIG. 4, thereby reducing the number of component parts, and improving assemblability.

Figure 4:
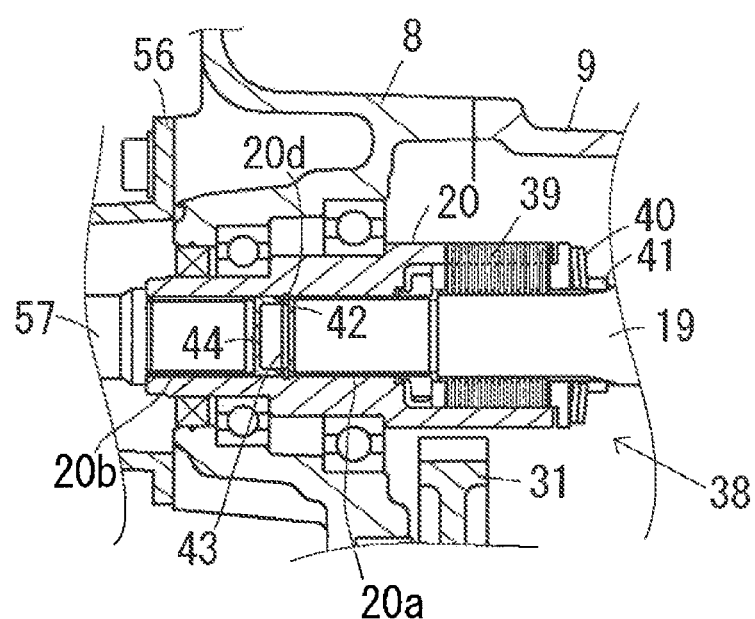
FIG. 4 is an enlarged. sectional view of an alternative front wheel torque limiter.

Alternatively, second output shaft 20 may be configured as shown in FIG. 4. Second output shaft 20 according to the embodiment shown in FIG. 4 is formed with an annular groove 20d into which an outer peripheral portion of retaining ring 43 is fitted. Annular groove 20d connects the front end of shaft hole 20a to the rear end of spline shaft hole 20b. In shaft hole 20a, washer 42 is interposed between retaining ring 43 fitted into annular groove 20d and the front end of first output shaft 19 fitted into shaft hole 20a. On the other hand, in spline shaft hole 20b, bore plug 44, which prevents fluid leakage, is interposed between retaining ring 43 fitted into annular groove 20d and the rear end of front wheel drive shaft 57 fitted into spline shaft hole 20b.

In this embodiment, bore plug 44 prevents fluid from leaking from shaft hole 20a into spline shaft hole 20b, i.e., prevents fluid in gear transmission housing 3a from leaking into belt transmission housing 2a. Washer 42 and retaining ring 43 absorb the thrust forces from first output shaft 19 and front wheel drive shaft 57.

It is further understood by those skilled in the art that the foregoing description is given of preferred embodiments of the disclosed apparatus and that various changes and modifications may be made in the invention without departing from the scope thereof defined by the following claims.

What is claimed is:

1. A transmission comprising:
   a housing;
   a transmission gear mechanism disposed in the housing;
   an output shaft for transmitting power outputted from the transmission gear mechanism to a front wheel and a rear wheel in a vehicle;
   a torque limiter for the front wheel; and
   a torque limiter for the rear wheel, wherein the output shaft is provided with both of the torque limiters in the housing, wherein each of the torque limiters includes an input member and an output member, and wherein the output shaft serves as both the input member of one of the torque limiters and the output member of the other of the torque limiters.

2. The transmission according to claim 1, wherein each of the torque limiters includes an input side friction disc engaging with the input member and an output side friction disc engaging with the output member, wherein when a load applied on the output member is not more than a load threshold, the output side friction disc is pressed against the input side friction disc so that the output side friction disc is rotatably integral with the input side friction disc so as to transmit power from the input member to the output member, and wherein when the load applied on the output member exceeds the load threshold, the output side friction disc rotates relative to the input side friction disc so as to prevent a torque of the output member caused by the load from being transmitted to the input member.

3. The transmission according to claim 2, wherein the load threshold of the torque limiter for the front wheel is set to be smaller than the load threshold of the torque limiter for the rear wheel.

4. The transmission according to claim 2, wherein the load threshold of at least one of the torque limiters is adjustable.

* * * * *